US012342437B2

(12) United States Patent
Zhang et al.

(10) Patent No.: US 12,342,437 B2
(45) Date of Patent: Jun. 24, 2025

(54) FLICKER-FREE THYRISTOR LIGHT-ADJUSTING LINEAR CONSTANT CURRENT CIRCUIT

(71) Applicant: General Lighting Electronic Co., Ltd., Zhongshan (CN)

(72) Inventors: Meiyi Zhang, Zhongshan (CN); Jiukui Xie, Zhongshan (CN)

(73) Assignee: General Lighting Electronic Co., Ltd., Zhongshan (CN)

( * ) Notice: Subject to any disclaimer, the term of this patent is extended or adjusted under 35 U.S.C. 154(b) by 156 days.

(21) Appl. No.: 18/453,255

(22) Filed: Aug. 21, 2023

(65) Prior Publication Data

US 2024/0373532 A1 Nov. 7, 2024

(30) Foreign Application Priority Data

May 5, 2023 (CN) ......................... 202321050527.6

(51) Int. Cl.
*H05B 45/59* (2022.01)
*H05B 45/345* (2020.01)
*H05B 45/36* (2020.01)

(52) U.S. Cl.
CPC ........... *H05B 45/59* (2022.01); *H05B 45/345* (2020.01); *H05B 45/36* (2020.01)

(58) Field of Classification Search
CPC ....... H05B 45/59; H05B 45/36; H05B 45/345
See application file for complete search history.

(56) References Cited

U.S. PATENT DOCUMENTS 9,930,735 B1 * 3/2018 Hsu ...................... H05B 45/395
10,201,064 B1 * 2/2019 Soto ..................... H05B 45/375
11,464,091 B2 * 10/2022 Park ........................ H02M 7/06
2009/0212721 A1 * 8/2009 Maruyama ............. H05B 45/37 315/307
2011/0227489 A1 * 9/2011 Huynh .................. H05B 45/14 315/185 R
2012/0268022 A1 * 10/2012 Liu ........................ H05B 45/46 315/192
2015/0334801 A1 * 11/2015 Wu ........................ H05B 45/40 315/186
2017/0027034 A1 * 1/2017 Nozawa ................. H05B 45/38
2017/0318631 A1 * 11/2017 Zhao ...................... H05B 45/48
2020/0107417 A1 * 4/2020 Zhuang .................. H05B 45/36
(Continued)

FOREIGN PATENT DOCUMENTS

CN 210670672 U * 6/2020
CN 220965211 U * 5/2024 ............ H05B 45/10
(Continued)

*Primary Examiner* — Adam D Houston

(57) ABSTRACT

A flicker-free thyristor light-adjusting linear constant current circuit is provided, which includes a rectification and constant current module and an illumination module. The illumination module is internally provided with a ripple elimination module, which includes a ripple suppressor U4, a ripple suppressor U5, a capacitor C1, and a capacitor C2. The ripple elimination module is electrically connected to the illumination module. The ripple suppressor connected to the negative pole of the LED array in this present disclosure can suppress the ripple coefficient of the pre-driver, and filter out the ripple by setting a capacitor, so that the LED array will not flicker when emitting light.

1 Claim, 1 Drawing Sheet

(56) References Cited

U.S. PATENT DOCUMENTS

| | | | | |
|---|---|---|---|---|
| 2020/0314975 | A1* | 10/2020 | Pruett | H05B 39/041 |
| 2021/0100079 | A1* | 4/2021 | Vollmer | H05B 45/46 |
| 2024/0147588 | A1* | 5/2024 | Wray | H05B 45/46 |
| 2024/0373532 | A1* | 11/2024 | Zhang | H05B 45/59 |

FOREIGN PATENT DOCUMENTS

| | | | | | |
|---|---|---|---|---|---|
| EP | 3370484 | A1 | * | 9/2018 | H05B 45/10 |
| JP | 2013021037 | A | * | 1/2013 | |
| JP | 2019057696 | A | * | 4/2019 | |
| KR | 102344128 | B1 | * | 12/2021 | |
| KR | 102609965 | B1 | * | 12/2023 | |
| WO | WO-2007055519 | A1 | * | 5/2007 | H05B 33/0815 |
| WO | WO-2021106360 | A1 | * | 6/2021 | H05B 45/10 |

* cited by examiner

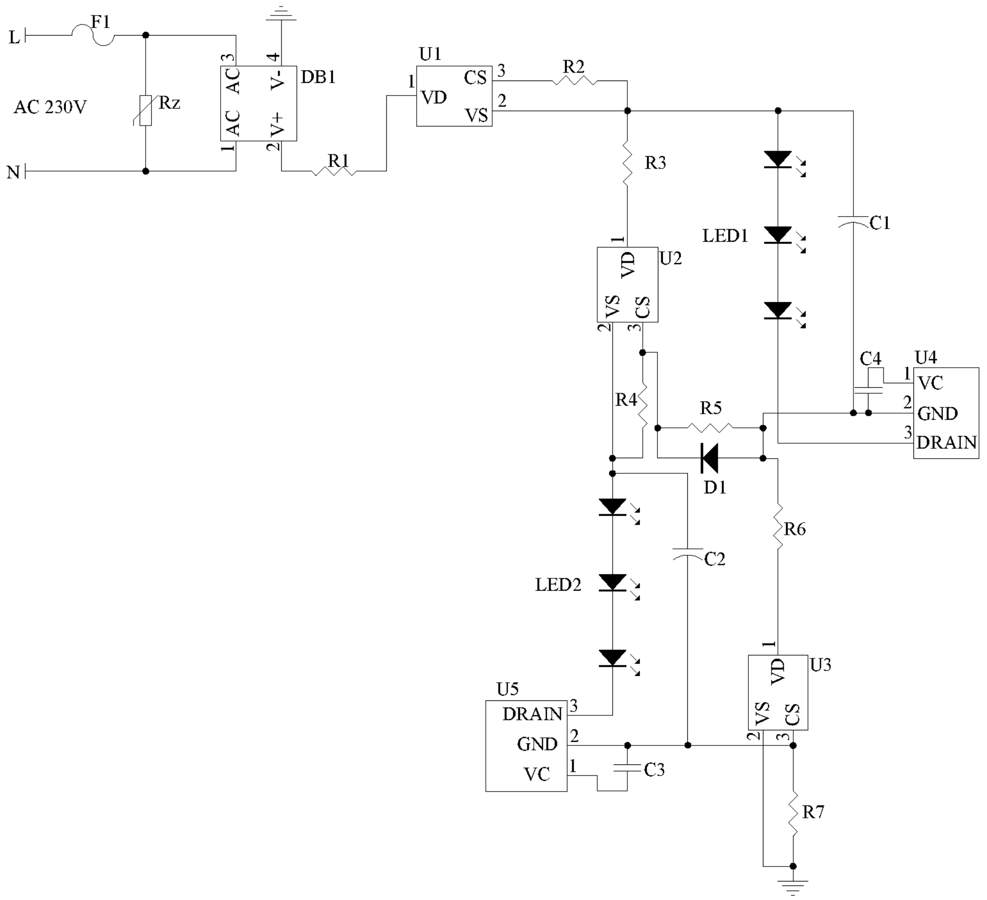
L
N
F1
AC 230V
Rz
DB1
AC
AC
V-
V+
U1
VD
CS
VS
R1
R2
R3
R4
R5
R6
R7
U2
U3
U4
U5
LED1
LED2
C1
C2
C3
C4
D1
VC
GND
DRAIN

FLICKER-FREE THYRISTOR LIGHT-ADJUSTING LINEAR CONSTANT CURRENT CIRCUIT

CROSS-REFERENCE TO RELATED APPLICATIONS

This application claims to the benefit of priority from Chinese Application No. 202321050527.6 with a filing date of May 5, 2023. The content of the aforementioned applications, including any intervening amendments thereto, are incorporated herein by reference.

TECHNICAL FIELD

The present disclosure relates to an illumination circuit, in particular to a flicker-free thyristor light-adjusting linear constant current circuit.

BACKGROUND

In the common thyristor dimming circuit on the market, a constant current driver is installed on the branch of the lamp group, and the lamp group will operate in parallel when the voltage reaches the lighting voltage of the lamp group. As the voltage gradually increases from 0V, the constant current driver will gradually switch the operation mode of the lamp group from parallel connection to series connection. By adjusting the connection manner of the lamp group in the circuit, the brightness of all the lamp beads when the lamp group emits light remains consistent, but it also has certain shortcomings. When adjusting the brightness of the lamp, it can cause flickering of the lamp. The flickering of the lamp can stimulate the human visual system, cause eye fatigue, headache, and other conditions, and have a certain impact on the user's health, so it is necessary to improve the current thyristor dimming circuit without flicker.

SUMMARY

In order to overcome the shortcomings of the existing technology, the present disclosure provides a flicker-free thyristor light-adjusting linear constant current circuit.

The technical solution adopted by this present disclosure to solve its technical problems is shown as below:

A flicker-free thyristor light-adjusting linear constant current circuit, including a rectification and constant current module and an illumination module. The illumination module is internally provided with a ripple elimination module, and the ripple elimination module includes a ripple suppressor U4, a ripple suppressor U5, a capacitor C1, and a capacitor C2. The ripple elimination module is electrically connected to the illumination module, and the setting of the ripple elimination module can prevent the illumination module from generating flicker of light during illumination, thereby improving the luminous effect.

As a further improvement of this present disclosure, the rectification and constant current module includes a bridge rectifier DB1, a constant current driver U1, a resistor Rz, a fuse F1, a resistor R1, and a resistor R2. The pin 1 of the bridge rectifier DB1 is connected to the zero line of the AC (alternating voltage) voltage AC, the pin 2 is connected in series with the resistor R1 and then connected to the pin 1 of the constant current driver U1. The pin 3 is connected to the fuse F1 and then connected to the live wire of the AC voltage AC, and the pin 4 is ground connection. One end of the resistor Rz is connected to the pin 1 of the bridge rectifier DB1, and the other end of the resistor Rz is connected to the contact point between the pin 3 of the bridge rectifier DB1 and the fuse F1. The pin 2 of the constant current driver U1 is connected to the illumination module, the pin 3 of the constant current driver U1 is connected in series with the resistor R2 and then connected the contact point between the pin 2 of the constant current driver U1 and the illumination module. The specification of the resistor R1 is 1206, with a resistance value of 1K, and the specification of the resistor R2 is 0805, with a resistance value of 27R.

As a further improvement of this present disclosure, the illumination module includes a lighting lamp group LED1, a lighting lamp group LED2, a constant current driver U2, a constant current driver U3, a resistor R3, a resistor R4, a resistor R5, a capacitor C4, a diode D1, a resistor R6, a resistor R7, and a capacitor C3. One end of the resistor R3 is connected to the rectification and constant current module, the other end is connected to the pin 1 of the constant current driver U2, and the pin 2 of the constant current driver U2 is connected to the positive pole of the lighting lamp group LED2, and the pin 3 of the constant current driver U2 is connected to the resistor R4 and then connected to the contact point between the pin 2 of the constant current driver U2 and the lighting lamp group LED2. The negative pole of the lighting lamp group LED2 is connected to the pin 3 of the ripple suppressor U5, and one end of the capacitor C3 is connected to the pin 1 of the ripple suppressor U5, the other end is connected to the pin 2 of the ripple suppressor U5; one end of the capacitor C2 is connected to the contact point between the pin 2 of the constant current driver U2 and the positive pole of the lighting lamp group LED2, and the other end is connected to the contact point between the capacitor C3 and the pin 2 of the ripple suppressor U5. The pin 1 of the constant current driver U3 is connected in series with the resistor R6 and then connected to the positive pole of the diode D1. The negative pole of the diode D1 is connected to the contact point between the pin 3 of the constant current driver U2 and the resistor R4. The resistor R5 is connected in parallel at both ends of the diode D1. The pin 2 of the constant current driver U3 is ground connection, and the pin 3 of the constant current driver U3 is connected to the contact point between the capacitor C3 and the pin 2 of the ripple suppressor U5. One end of the resistor R7 is connected to the pin 3 of the constant current driver U3, and the other end is connected to the contact point between the pin 2 of the constant current driver U3 and the ground wire. The positive pole of the lighting lamp group LED1 is connected to the contact point between the resistor R3 and the rectification and constant current module, the negative pole is connected to the pin 3 of the ripple suppressor U4, one end of the capacitor C4 is connected to the pin 1 of the ripple suppressor U4, and the other end is connected to the pin 2 of the ripple suppressor U4. One end of the capacitor C1 is connected to the contact point between the resistor R3 and the rectification and constant current module, the other end is divided into two circuits, one connected to the contact point between the capacitor C4 and the pin 2 of the ripple suppressor U4, and the other one connected to the contact point between the resistor R5 and the positive pole of diode D1. The specifications of the resistor R3 and the resistor R6 are 1206 with a resistance value of 1K, the specification of the resistor R4 is 1206 with a resistance value of 75R, the specifications of the resistor R5 is 1206 with a resistance value of 33K, the specification of the resistor R7 is 0805 with a resistance value of 35R. The withstand voltage of capacitors C1 and C2 is 160V with a capacity of 10UF, and the specifications of the capacitors C3 and C4 are 0805, with a withstand voltage of 150V and a capacity of 10UF. The diode D1 is an F7 diode packaged in SOD-123.

Further, the models of the ripple suppressor U4 and the ripple suppressor U5 are RM06R20.

Further, the models of the constant current driver U1, the constant current driver U2, and the constant current driver U3 are DT3100.

Further, the range of the AC voltage is 200V-230V.

The advantageous effect of this present disclosure is that the negative pole of the LED array in the illumination module is connected to a ripple suppressor, and the LED array is connected in parallel with a capacitor. The ripple suppressor connected to the negative pole of the LED array in this present disclosure can suppress the ripple coefficient of the pre-driver, and filter out the ripple by setting a capacitor, so that the LED array will not flicker when emitting light.

BRIEF DESCRIPTION OF THE DRAWINGS

The following is a further illustration of the present disclosure in conjunction with the accompanying drawings and embodiments.

FIG. 1 is a circuit structure diagram of the present disclosure.

DETAILED DESCRIPTION OF THE EMBODIMENTS

In order to make the objective, technical solution, and advantages of this present disclosure clearer, the following is a further detailed illustration of this present disclosure, combined with specific embodiment and referring to the attached drawings. It should be noted that, without conflict, the embodiments of the present present disclosure and the features in the embodiments can be combined with each other.

It should be understood that these descriptions are only illustrative and not intended to limit the scope of the present present disclosure.

Referring to FIG. 1, a flicker-free thyristor light-adjusting linear constant current circuit, which includes a rectification and constant current module and an illumination module. The illumination module is internally provided with a ripple elimination module, and the ripple elimination module includes a ripple suppressor U4, a ripple suppressor U5, a capacitor C1, and a capacitor C2. The ripple elimination module is electrically connected to the illumination module, and the setting of the ripple elimination module can prevent the illumination module from generating flicker of light during illumination, thereby improving the luminous effect.

The rectification and constant current module includes a bridge rectifier DB1, a constant current driver U1, a resistor Rz, a fuse F1, a resistor R1, and a resistor R2. The pin 1 of the bridge rectifier DB1 is connected to the zero line of the AC (alternating voltage) voltage AC, the pin 2 is connected in series with the resistor R1 and then connected to the pin 1 of the constant current driver U1. The pin 3 is connected to the fuse F1 and then connected to the live wire of the AC voltage AC, and the pin 4 is ground connection. One end of the resistor Rz is connected to the pin 1 of the bridge rectifier DB1, and the other end of the resistor Rz is connected to the contact point between the pin 3 of the bridge rectifier DB1 and the fuse F1. The pin 2 of the constant current driver U1 is connected to the illumination module, the pin 3 of the constant current driver U1 is connected in series with the resistor R2 and then connected the contact point between the pin 2 of the constant current driver U1 and the illumination module. The specification of the resistor R1 is 1206, with a resistance value of 1K, and the specification of the resistor R2 is 0805, with a resistance value of 27R.

The illumination module includes a lighting lamp group LED1, a lighting lamp group LED2, a constant current driver U2, a constant current driver U3, a resistor R3, a resistor R4, a resistor R5, a capacitor C4, a diode D1, a resistor R6, a resistor R7, and a capacitor C3. One end of the resistor R3 is connected to the rectification and constant current module, the other end is connected to the pin 1 of the constant current driver U2, the pin 2 of the constant current driver U2 is connected to the positive pole of the lighting lamp group LED2, and the pin 3 of the constant current driver U2 is connected to the resistor R4 and then connected to the contact point between the pin 2 of the constant current driver U2 and the lighting lamp group LED2. The negative pole of the lighting lamp group LED2 is connected to the pin 3 of the ripple suppressor U5, one end of the capacitor C3 is connected to the pin 1 of the ripple suppressor U5, and the other end is connected to the pin 2 of the ripple suppressor U5. One end of the capacitor C2 is connected to the contact point between the pin 2 of the constant current driver U2 and the positive pole of the lighting lamp group LED2, and the other end is connected to the contact point between the capacitor C3 and the pin 2 of the ripple suppressor U5. The pin 1 of the constant current driver U3 is connected in series with the resistor R6 and then connected to the positive pole of the diode D1. The negative pole of the diode D1 is connected to the contact point between the pin 3 of the constant current driver U2 and the resistor R4. The resistor R5 is connected in parallel at both ends of the diode D1. The pin 2 of the constant current driver U3 is ground connection, and the pin 3 of the constant current driver U3 is connected to the contact point between the capacitor C3 and the pin 2 of the ripple suppressor U5. One end of the resistor R7 is connected to the pin 3 of the constant current driver U3, and the other end is connected to the contact point between the pin 2 of the constant current driver U3 and the ground wire. The positive pole of the lighting lamp group LED1 is connected to the contact point between the resistor R3 and the rectification and constant current module, the negative pole is connected to the pin 3 of the ripple suppressor U4, one end of the capacitor C4 is connected to the pin 1 of the ripple suppressor U4, and the other end is connected to the pin 2 of the ripple suppressor U4. One end of the capacitor C1 is connected to the contact point between the resistor R3 and the rectification and constant current module, the other end is divided into two circuits, one connected to the contact point between the capacitor C4 and the pin 2 of the ripple suppressor U4, and the other one connected to the contact point between the resistor R5 and the positive pole of diode D1. The specifications of the resistor R3 and the resistor R6 are 1206 with a resistance value of 1K, the specification of the resistor R4 is 1206 with a resistance value of 75R, the specifications of the resistor R5 is 1206 with a resistance value of 33K, the specification of the resistor R7 is 0805 with a resistance value of 35R. The withstand voltage of capacitors C1 and C2 is 160V with a capacity of 10UF, and the specifications of the capacitors C3 and C4 are 0805, with a withstand voltage of 150V and a capacity of 10UF. The diode D1 is an F7 diode packaged in SOD-123.

The models of the ripple suppressor U4 and the ripple suppressor U5 are RM06R20. RM06R20 suppresses the LED current ripple of 100/120 Hz by controlling the internal MOS. The capacitor between the VC pin and GND pin of RM06R20 is a compensation capacitor. RM06R20 converts the voltage on the capacitor into a reference voltage and adjusts the LED current through negative feedback control.

The models of the constant current driver U1, the constant current driver U2, and the constant current driver U3 are DT3100.

The range of the AC voltage is 200V-230V.

When the AC voltage from the electric supply is obtained as 100 Hz direct current through the bridge rectifier DB1, it is connected to the lighting lamp group LED1 through the constant current driver U1, and connected to the constant current driver U2 through the resistor R2 at the same time. The negative poles of the lighting lamp group LED1 and lighting lamp group LED2 are respectively connected with ripple suppressors U4 and U5 to suppress the 100 Hz ripple, reducing the ripple coefficient. The ripple is also filtered out through capacitors C1 and C2, so that the effect of flicker free is achieved.

When the voltage is turned on, the voltage gradually increases from 0-130V. As the voltage gradually increases, the constant current driver U1 is directly connected, and a portion of the current passes through the ripple suppressor U4 from the lighting lamp group LED1 and then through the constant current driver U3 to the ground. Similarly, another part of the current flows through the constant current driver U2, then flows from the lighting lamp group LED2 to the ripple suppressor U5, and then flows through the resistor R7 to the ground. The two lighting lamp groups operate in parallel.

When the voltage rises from 130V to 230V, the constant current driver U1 operates normally. The current flows from the constant current driver U1 to the lighting lamp group LED1, then flows through the ripple suppressor U4 to the diode D1 and resistor R4, and then flows through the lighting lamp group LED2 and the ripple suppressor U5, and finally flows through the resistor R7 to the ground. At this time, the lighting lamp group LED1 and lighting lamp group LED2 are in series working mode. By changing the working mode of the lighting lamp groups through the voltage, it can be ensured that the brightness of all lamp beads remains consistent when the lighting lamp group starts, resulting in better luminous effect.

In this present disclosure, the term "a plurality of" refers to two or more, unless otherwise specified. The term "and/or" used in this article includes any and all combinations of one or more related listed items. The terms "install", "be connected with", "be connected to", "be fixed with" and other terms should be understood in a broad sense. For example, "be connected to" may be a fixed connection, a detachable connection, or an integrated connection; "be connected with" may be directly connected or indirectly connected through intermediate media. For ordinary skilled person in the art, the specific meanings of the above terms in this present disclosure can be understood based on specific circumstances.

It should be noted that when a component is referred to as "assembled on", "installed on", "fixed on" or "set on" another component, it may be directly on another component or indirectly. When a component is considered to be "connected" to another component, it may be directly connected to another component or indirectly. The terms "vertical", "horizontal", "up", "down", "left", "right", and similar expressions used in this article are for illustrative purposes only and do not necessarily represent the only implementation method.

In the description of this specification, the terms "one embodiment", "some embodiments", "specific embodiments", etc. refer to the specific features, structures, materials, or features described in conjunction with the embodiment or example being included in at least one embodiment or example of this present disclosure. In this specification, the schematic description of the above terms do not necessarily refer to the same embodiments or examples. Moreover, the specific features, structures, materials, or features described can be combined in an appropriate manner in any one or more embodiments or examples.

Although embodiments of the present present disclosure have been shown and described, the ordinary skilled person in the art can understand that various changes, modifications, substitutions, and variations can be made to these embodiments without departing from the principles and objectives of the present present disclosure. The scope of the present present disclosure is limited by the claims and their equivalents.

What is claimed is:

1. A flicker-free thyristor light-adjusting linear constant current circuit, comprising a rectification and constant current module and an illumination module, wherein the illumination module is internally provided with a ripple elimination module; the ripple elimination module comprises a ripple suppressor U4, a ripple suppressor U5, a capacitor C1, and a capacitor C2; the ripple elimination module is electrically connected to the illumination module; the rectification and constant current module comprises a bridge rectifier DB1, a constant current driver U1, a resistor Rz, a fuse F1, a resistor R1, and a resistor R2; a pin 1 of the bridge rectifier DB1 is connected to a zero line of an AC voltage, a pin 2 of the bridge rectifier DB1 is connected in series with the resistor R1 and then connected to a pin 1 of the constant current driver U1, a pin 3 is connected to the fuse F1 and then connected to a live wire of the AC voltage, and a pin 4 is ground connection; one end of the resistor Rz is connected to the pin 1 of the bridge rectifier DB1, and the other end of the resistor Rz is connected to a contact point between a pin 3 of the bridge rectifier DB1 and the fuse F1; a pin 2 of the constant current driver U1 is connected to the illumination module, a pin 3 of the constant current driver U1 is connected in series with the resistor R2 and then connected a contact point between the pin 2 of the constant current driver U1 and the illumination module; a specification of the resistor R1 is 1206, with a resistance value of 1 K, and a specification of the resistor R2 is 0805, with a resistance value of 27 R;

the illumination module comprises a lighting lamp group LED1, a lighting lamp group LED2, a constant current driver U2, a constant current driver U3, a resistor R3, a resistor R4, a resistor R5, a capacitor C4, a diode D1, a resistor R6, a resistor R7, and a capacitor C3, wherein one end of the resistor R3 is connected to the rectification and constant current module, and the other end is connected to a pin 1 of the constant current driver U2; a pin 2 of the constant current driver U2 is connected to a positive pole of the lighting lamp group LED2; a pin 3 of the constant current driver U2 is connected to the resistor R4 and then connected to a contact point between the pin 2 of the constant current driver U2 and the lighting lamp group LED2; a negative pole of the lighting lamp group LED2 is connected to a pin 3 of the ripple suppressor U5, one end of the capacitor C3 is connected to a pin 1 of the ripple suppressor U5, and the other end is connected to a pin 2 of the ripple suppressor U5; one end of the capacitor C2 is connected to a contact point between the pin 2 of the constant current driver U2 and the positive pole of the lighting lamp group LED2, and the other end is connected to a contact point between the capacitor C3 and the pin 2 of the ripple suppressor U5; a pin 1 of the constant current driver U3 is connected in series with the resistor R6 and then connected to a positive pole of the diode D1; a negative pole of the diode D1 is connected to a contact point between the pin 3 of the constant current driver U2 and the resistor R4; the resistor R5 is connected in parallel at both ends of the diode D1; a pin 2 of the constant current driver U3 is ground connection; a pin 3 of the constant current driver U3 is connected to a contact point between the capacitor C3 and the pin 2 of the ripple suppressor U5; one end of the resistor R7 is connected to the pin 3 of the constant current driver U3, and the other end is connected to a contact point between the pin 2 of the constant current driver U3 and a ground wire; a positive pole of the lighting lamp group LED1 is connected to a contact point between the resistor R3 and the rectification and constant current module, a negative pole of the lighting lamp group LED1 is connected to a pin 3 of the ripple suppressor U4; one end of the capacitor C4 is connected to a pin 1 of the ripple suppressor U4, and the other end of the capacitor C4 is connected to a pin 2 of the ripple suppressor U4; one end of the capacitor C1 is connected to the contact point between the resistor R3 and the rectification and constant current module, the other end of the capacitor C1 is divided into two circuits, one connected to a contact point between the capacitor C4 and the pin 2 of the ripple suppressor U4, and the other one connected to a contact point between the resistor R5 and a positive pole of diode D1; specifications of the resistor R3 and the resistor R6 are 1206 with a resistance value of 1 K, a specification of the resistor R4 is 1206 with a resistance value of 75 R, a specification of the resistor R5 is 1206 with a resistance value of 33 K, a specification of the resistor R7 is 0805 with a resistance value of 35 R; a withstand voltage of capacitors C1 and C2 is 160 V with a capacity of 10 UF, specifications of the capacitors C3 and C4 are 0805, with a withstand voltage of 150 V and a capacity of 10 UF; and the diode D1 is an F7 diode packaged in SOD-123; and models of the ripple suppressor U4 and the ripple suppressor U5 are RM06R20; models of the constant current driver U1, the constant current driver U2, and the constant current driver U3 are DT3100; and a range of the AC voltage is 200 V-230 V; when the voltage is turned on, the voltage gradually increases from 0-130 V, as the voltage gradually increases, the constant current driver U1 is directly connected, and a portion of the current passes through the ripple suppressor U4 from the lighting lamp group LED1 and then flows through the constant current driver U3 to the ground; similarly, another part of the current flows through the constant current driver U2, then flows from the lighting lamp group LED2 to the ripple suppressor U5, and then flows through the resistor R7 to the ground, and the two lighting lamp groups operate in parallel mode; when the voltage rises from 130 V to 230 V, the constant current driver U1 operates normally, the current flows from the constant current driver U1 to the lighting lamp group LED1, then flows through the ripple suppressor U4 to the diode D1 and resistor R4, then flows through the lighting lamp group LED2 and the ripple suppressor U5, and finally flows through the resistor R7 to the ground; at this time, the lighting lamp group LED1 and the lighting lamp group LED2 are in series working mode.

* * * * *